(12) United States Patent
Freyermuth et al.

(10) Patent No.: US 6,354,151 B1
(45) Date of Patent: Mar. 12, 2002

(54) MACHINE FOR PRE-ADJUSTING AND BALANCING A TOOL-HOLDER

(75) Inventors: Alain Freyermuth, Pfaffenhoffen (FR); Klaus-Peter Ohms, Darmstadt (DE); Helmuth Graf, Balgach (CH)

(73) Assignee: EPB Societe Anoyme, Bouxwiller (FR)

( * ) Notice: Subject to any disclaimer, the term of this patent is extended or adjusted under 35 U.S.C. 154(b) by 0 days.

(21) Appl. No.: 09/508,170
(22) PCT Filed: Sep. 4, 1998
(86) PCT No.: PCT/FR98/01901
  § 371 Date: Apr. 19, 2000
  § 102(e) Date: Apr. 19, 2000
(87) PCT Pub. No.: WO99/12703
  PCT Pub. Date: Mar. 18, 1999

(30) Foreign Application Priority Data
  Sep. 8, 1997 (FR) .............................. 97 11271

(51) Int. Cl.⁷ ................................. G01M 1/00
(52) U.S. Cl. .......................... 73/460; 73/471
(58) Field of Search .............. 73/460, 462, 471, 73/474, 484; 72/67, 80; 82/903

(56) References Cited

U.S. PATENT DOCUMENTS 3,280,865 A   10/1966  Alexander
5,763,777 A * 6/1998  Grim et al. ................ 73/460

FOREIGN PATENT DOCUMENTS

| EP | 247 939 | 12/1987 |
| EP | 849 035 | 6/1998 |
| FR | 2 548 349 | 1/1985 |
| JP | 2-131867 | 5/1990 |
| JP | 10-138093 | 5/1998 |

* cited by examiner

Primary Examiner—Helen Kwok
(74) Attorney, Agent, or Firm—Young & Thompson

(57) ABSTRACT

A machine for pre-adjusting and balancing a tool-holder, includes a support frame provided with a single rotary tool spindle, a column supporting a dimension-measuring arm, a console displaying the measurements and a protective hood preventing access to a risk area when the spindle is rotating.

14 Claims, 2 Drawing Sheets

MACHINE FOR PRE-ADJUSTING AND BALANCING A TOOL-HOLDER

BACKGROUND OF THE INVENTION

The present invention relates to the field of the environment of machine tools, in particular digitally controlled machines, machining centers, transfer machines or lines, for high-speed machining or for which it is necessary to pre-adjust and/or measure and balance the tool holders used, and has for its object a machine for the pre-adjustment and balancing of machine tools.

DESCRIPTION OF THE RELATED ART

There exist at present various devices permitting measuring a tool assembled on its tool holder. However, with the advent of high-speed machining and higher and higher speeds of rotation of the machine spindles, it is no longer sufficient only to measure the tool, but it is also necessary to minimize its intrinsic unbalance.

There are also known machines for balancing, also called balancers, permitting measuring the disequilibrium of a piece. These machines are generally self-contained and very often specific and not adapted to balancing machine tools.

As a result, it is necessary to manipulate the tool holders and/or the tools several times, on different machines, to provide all the information necessary for good knowledge of each tool holder and/or tool.

SUMMARY OF THE INVENTION

The present invention has for its object to overcome these drawbacks by providing a machine for pre-adjusting and balancing tool holders, permitting the measurement of the parameters of a tool as well as the determination of the residual unbalance of a same tool holder and/or tool without movement of the latter, by a single process.

According to the invention, the machine for pre-adjusting and balancing is characterized in that it is essentially constituted by a support frame provided with a single tool-holding spindle, which rotates, by a support column of a dimensional measurement on, by a display console for the measurements and by a protective hood preventing access to the danger zone during rotation of the spindle.

BRIEF DESCRIPTION OF THE DRAWINGS

The invention will be better understood from the following description, which relates to a preferred embodiment, given by way of non-limiting example, and explained with reference to the accompanying schematic drawings, in which.

DESCRIPTION OF THE PREFERRED EMBODIMENT

Figure 1:
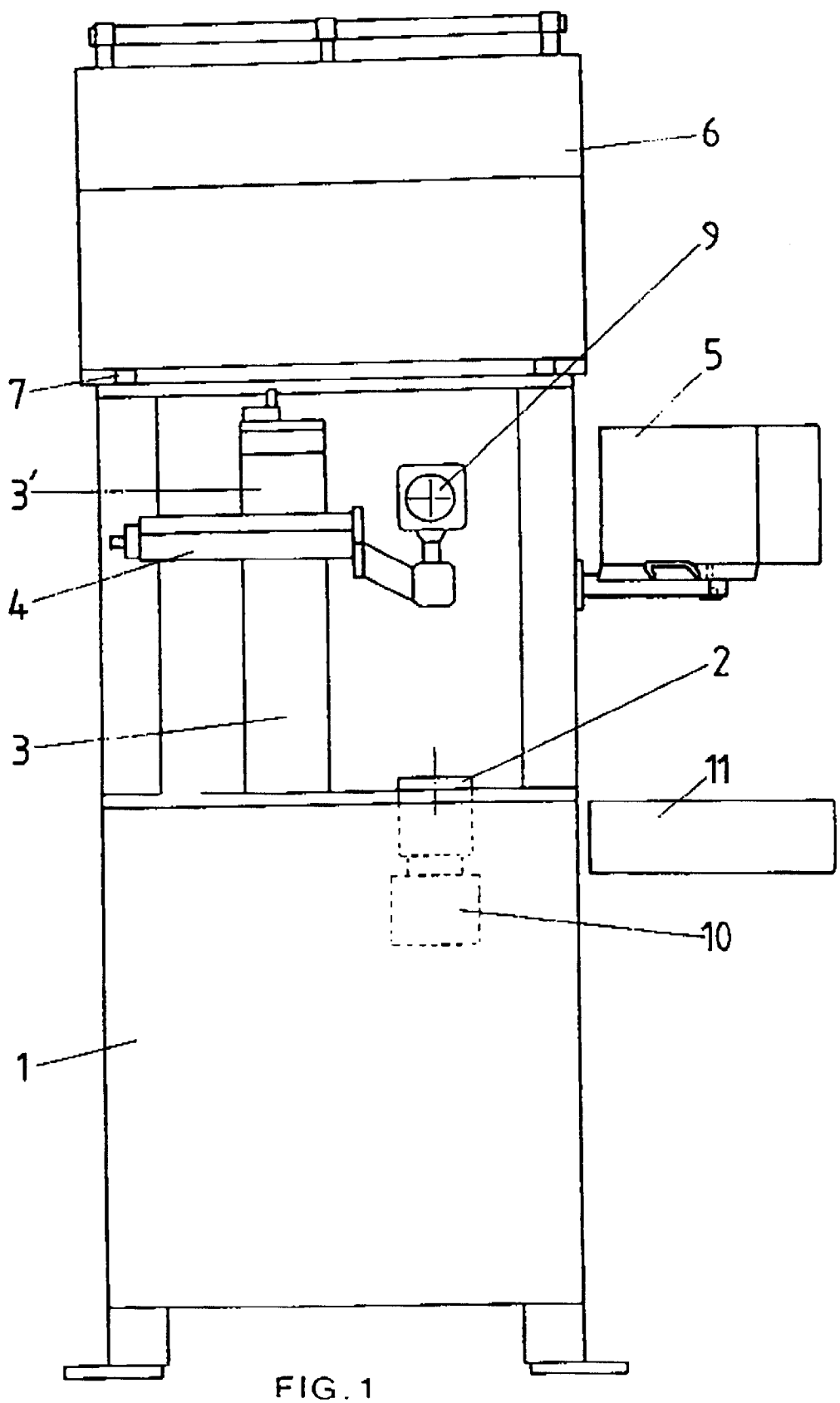
FIG. 1 is an elevational view of the machine, the protective hood being in the open position.
Figure 2:
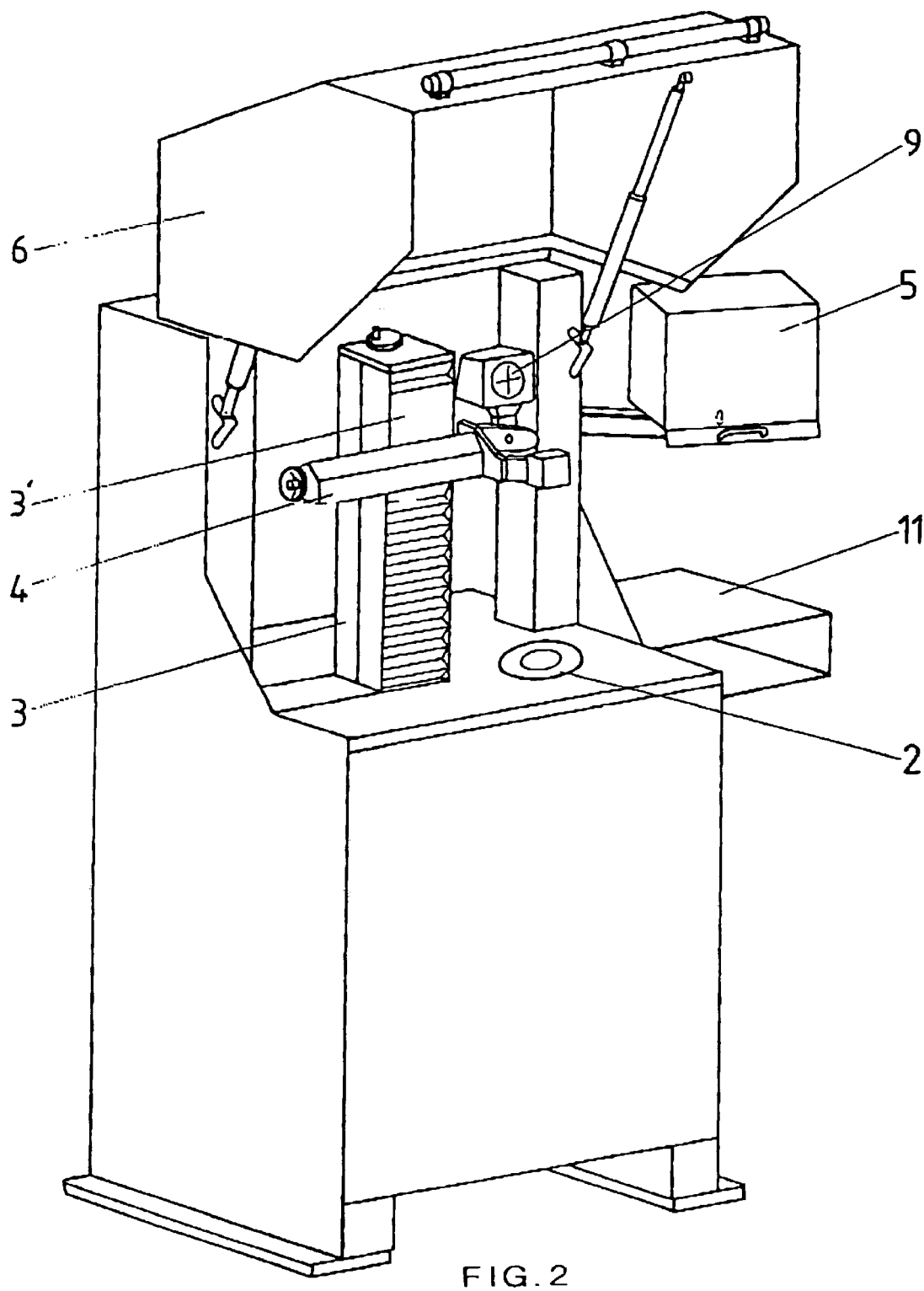
FIG. 2 is a perspective view of the machine.

FIGS. 1 and 2 of the accompanying drawings show by way of example a machine for pre-adjusting and balancing which is essentially constituted by support frame 1 provided with a single tool-holding spindle 2, which rotates, by a support column 3 for an arm 4 for dimensional measurement, by a console 5 for displaying measurements and by a protective hood 6 preventing access to the danger zone during rotation of the spindle 2.

The support frame 1 is preferably in the form of a mechanically welded structure and the protective hood 6 is mounted with the possibility of pivoting on the upper portion of said support frame 1 by means of hinges 7. This support frame 1 comprises a central working zone, in which are disposed the tool-holding spindle 2 and the column 3 for supporting an arm 4 for dimensional measurement, the tool-holding spindle 2 being in common with the two operations of re-adjustment and balancing, which is to say of dimensional measurement and of the unbalance of the tool holder.

Preferably, the tool-holding spindle 2 is positioned vertically in the support frame 1, parallel to the column 3 for supporting the arm 4 for dimensional measurement. This latter is mounted on the support column 3 with the possibility of adjustment, on the one hand, by vertical displacement by means of a carriage 3' and, on the other hand, perpendicularly relative to said column 3 by sliding on said carriage 3'. Such a mounting of the measurement arm 1 permits its movement in two perpendicular directions, about the tool holder to be measured, without requiring the slightest movement of this latter. The means permitting such mounting of the measuring arm 4 are known to those skilled in the art and do not require a particularly detailed description.

Moreover, the measuring arm 4 is provided, at its end adjacent the vertical axis of the tool-holding spindle 2, with a measuring projector 9. Such a projector 9 is adapted to project the contours of the tool on a screen and to permit the measurement by taking data from the measuring rules provided on the arm 4 and the column 3. These data can be transmitted, either directly to the console 5 for displaying measurements, or to a computer for processing and reproduction of data.

The tool-holding spindle 2 is driven in rotation by an electric motor 10 or the like. Thus, for measuring unbalance, the spindle 2 is driven, whilst it is free in rotation for dimensional measurement. This tool-holding spindle 2 can be provided moreover with interchangeable adaptor sockets (not shown) permitting the measurement and adjustment of tool holders of different dimensions for different machines.

According to a characteristic of the invention, the protective hood 6 coacts with closure detection means (not shown) provided on the support frame 1 and permitting the starting of the motor 10 to drive the spindle 2 in the closed position of said protective hood 6. These closure detection means can be constituted, in a known manner, by normally open contacts, such that the opening of the hood 6 will have the immediate effect of cutting the supply to the motor 10. To improve safety, the support frame 1 can be provided moreover with a locking device of the mechanical, electromagnetic or other lock, preventing any opening during operation of the motor 10.

Moreover, the arm 4 for dimensional measurement and/or the support column 3 can also be provided with contacts at the end of the retraction path (not shown) preventing any starting of the motor 10 for driving the spindle 2 unless they are actuated. Thus, a measurement of the unbalance of a tool holder cannot be made unless the arm 4 is completely retracted into its position spaced from the axis of the spindle 2 and at a maximum distance from the bearing plane of this latter, namely in the position shown in the accompanying drawing.

Measuring of the unbalance is thus effected with the protective hood 6 closed and, if desired, locked, and the measurement arm 4 with the projector 9 in disengaged position. For dimensional measurement, access to the spindle 2 and to the measurement arm 4 is necessary and is carried out with the protective hood 6 swung to the open position.

The console 5 for displaying measurements is laterally fixed on the support frame 1, which comprises moreover at least one tray 11 for receiving computer material for receiving, printing and/or transmission of data, as well as for holding the small tools necessary for the different operations.

Thanks to the invention, it is possible to provide a machine for the pre-adjustment and balancing of tool holders suitable for a large number of machine tools or machining centers or the like and permitting carrying out the two operations of pre-adjustment and balancing without intermediate dismounting of the tool holder, nor changing of the adjustment station. As a result, there is a substantial shortening of the down time and a simplification of the procedures, all the characteristics of tool holder being adapted to be recorded simultaneously at the same adjustment station.

Moreover, the invention also permits obtaining a saving of space at the workplace because of the combination of the two separate operations carried out previously on separate machines, by using a single machine leading to a corresponding reduction of the space required.

Of course, the invention is not limited to the embodiment described and shown in the accompanying drawing. Modifications remain possible, particularly as to the construction of the various elements or by substitution of technical equivalents, without thereby departing from the scope of protection of the invention.

What is claimed is:

1. Machine for the pre-adjustment and balancing of a tool holder, essentially constituted by:

a support frame (1) provided with a single rotatable tool-holding spindle (2), the tool-holding spindle being positioned for use in the two operations of pre-adjusting and balancing for measuring dimensions and imbalance of tool holders;

a column (3) for supporting an arm (4) for dimensional measurement;

a console (5) for displaying measurements; and a protective hood (6) preventing access to the danger zone during rotation of the spindle.

2. Machine according to claim 1, characterized in that the support frame (1) comprises a central working region, in which are disposed the tool-holding spindle (2) and the column (3) for supporting the arm (4) for dimensional measurement.

3. Machine according to claim 1, characterized in that the tool-holding spindle (2) is positioned vertically in the support frame (1), parallel to the column (3) for supporting the arm (4) for dimensional measurement.

4. Machine according to claim 1, further comprising:

a measuring projector (9) provided at an end of the arm (4) adjacent a vertical axis of the tool-holding spindle (2).

5. Machine according to claim 1, characterized in that the tool-holding spindle (2) is driven in rotation by an electric motor (10).

6. Machine according to claim 1, characterized in that the tool-holding spindle (2) is provided moreover with interchangeable adaption sockets.

7. Machine according to claim 1, further comprising:

a drive motor connected to the tool-holding spindle (2); and a closure detector on the support frame, the protective hood (6) coacting with the closure detector to limit starting the drive motor (10) for the spindle (2) to the protective hood being in a closed position.

8. Machine according to claim 1, further comprising:

a motor connected to the tool-holding spindle (2); and a locking device provided on the support frame (1) preventing any opening of the protective hood (6) during operation of the motor (10).

9. Machine according to claim 1, further comprising:

a drive motor connected to the tool-holding spindle (2), wherein, the arm (4) for dimensional measurement and the column (3) are provided with end of path of retracted movement contacts preventing any starting of the motor (10) to drive the spindle (2) unless the movement contacts are actuated.

10. Machine according to claim 1, characterized in that the console (5) for displaying measurements is fixed laterally on the support frame (1) which comprises, moreover, at least one tray (11) for the reception of data-gathering material as well as receiving small tools.

11. Machine according to claim 2, characterized in that the tool-holding spindle (2) is positioned vertically in the support frame (1), parallel to the column (3) for supporting the arm (4) for dimensional measurement.

12. Machine according to claim 5, characterized in that the tool-holding spindle (2) is provided moreover with interchangeable adaption sockets.

13. Machine according to claim 7, characterized in that a drive motor is connected to the tool-holding spindle (2); and the support frame (1) is provided moreover with a lock preventing any opening of the protective hood (6) during operation of the motor (10).

14. A machine for the pre-adjustment and balancing of a tool holder, comprising:

a support frame (1);

a single rotatable tool-holding spindle mounted through a horizontal surface of the support frame;

a support column mounted on the horizontal surface and having a vertical axis parallel to a vertical axis of the spindle;

a carriage mounted on the support column;

a dimensional measurement arm mounted on the carriage to provide for movement in two perpendicular directions;

a measuring projector provided at an end of the measurement arm;

a console for displaying measurements; and a protective hood preventing access to a danger zone during rotation of the spindle.

* * * * *